United States Patent [19]
Molstad et al.

[11] Patent Number: 5,675,448
[45] Date of Patent: Oct. 7, 1997

[54] TRACK PITCH ERROR COMPENSATION SYSTEM FOR DATA CARTRIDGE TAPE DRIVES

[75] Inventors: Richard W. Molstad, St. Paul; Robert J. Youngquist, White Bear Lake; Bennett G. Dy, St. Paul, all of Minn.

[73] Assignee: Imation Corp., St. Paul, Minn.

[21] Appl. No.: 351,798

[22] Filed: Dec. 8, 1994

[51] Int. Cl.$^6$ ............................................. G11B 5/584
[52] U.S. Cl. ............................ 360/77.12; 360/78.12
[58] Field of Search ............................ 360/78.02, 78.01, 360/77.12, 77.04

[56] References Cited

U.S. PATENT DOCUMENTS

| | | | |
|---|---|---|---|
| 3,692,255 | 9/1972 | Von Behren | 242/343.2 |
| 4,254,500 | 3/1981 | Brookhart | 371/37.7 |
| 4,313,143 | 1/1982 | Zarr | 360/106 |
| 4,422,111 | 12/1983 | Moeller et al. | 360/72.1 |
| 4,476,503 | 10/1984 | Solhjell | 360/75 |
| 4,679,104 | 7/1987 | Dahlerud | 360/78.02 X |
| 4,750,067 | 6/1988 | Gerfast | 360/106 |
| 4,786,984 | 11/1988 | Seeman | 360/31 |
| 4,796,125 | 1/1989 | Karsh | 360/77.12 |
| 4,835,628 | 5/1989 | Hinz et al. | 360/48 |
| 5,008,765 | 4/1991 | Youngquist | 360/77.12 |
| 5,055,951 | 10/1991 | Behr | 360/77.12 |
| 5,057,950 | 10/1991 | Ozaki et al. | 360/72.2 |
| 5,070,419 | 12/1991 | Kiyonaga | 360/72.2 |
| 5,073,834 | 12/1991 | Best et al. | 300/77.08 |
| 5,081,548 | 1/1992 | Inazawa et al. | 360/72.2 |
| 5,091,805 | 2/1992 | Odaka et al. | 360/53 |
| 5,280,402 | 1/1994 | Anderson et al. | 360/106 |
| 5,343,341 | 8/1994 | Jahren | 360/77.12 |
| 5,379,165 | 1/1995 | Pahr | 360/78.02 |
| 5,432,652 | 7/1995 | Comeaux et al. | 360/77.12 |
| 5,448,430 | 9/1995 | Bailey et al. | 360/77.12 |
| 5,450,257 | 9/1995 | Tran et al. | 360/77.12 X |
| 5,457,586 | 10/1995 | Solhjell | 360/77.12 X |

FOREIGN PATENT DOCUMENTS

| | | |
|---|---|---|
| 0 443 810 A3 | 8/1991 | European Pat. Off. . |
| 0 529 930 A1 | 3/1993 | European Pat. Off. . |
| 42 16 896 A1 | 11/1992 | Germany . |

OTHER PUBLICATIONS

AN 91–366799, Anonymous, "Dedicated Track Servo for Precision Head Location," Nov. 10, 1991, Abstract (Derwent Publications Ltd.).

Floppy–Disk (6), CHIP, No. 10, p. 114 et seq., Oct. 1981.

CD–Player und R–DAT–Recorder, Wiebke, 1988, pp. 138–140.

*Primary Examiner*—Aristotelis M. Psitos
*Assistant Examiner*—James L. Habermehl
*Attorney, Agent, or Firm*—Charles L. Dennis II

[57] ABSTRACT

A track pitch error compensation system for tape drives of the type configured for reading data from and/or writing data to magnetic tape having adjacent servo tracks with apparent centerlines spaced about a tracking axis. The tape drive includes a multichannel head assembly having a plurality of channels of read gaps which produce position error signals (PES) representative of positions of the read gaps on the tracking axis with respect to the apparent centerlines of servo tracks on the tape, a positioner responsive to positioner drive signals for driving and positioning the head assembly on the tracking axis with respect to the servo tracks, and a servo control system connected between the head assembly and positioner for generating positioner drive signals causing a servoing read gap to be servo locked to a desired servo track as a function of the PES when operated in a closed-loop servo mode. The method includes determining and storing one or more track pitch error values for each magnetic tape, and determining a gain constant of the servo system. PES correction offsets representative of the magnitudes of positioner drive signals causing the positioner to drive the head assembly distances sufficient to compensate for the track pitch errors are calculated as a function of the track pitch errors and the gain constant, and stored. During closed-loop servo mode operation the PES correction offset is summed with the PES to cause the servoing read gap to be servo locked to the desired centerlines of the servo tracks.

7 Claims, 6 Drawing Sheets

TRACK PITCH ERROR COMPENSATION SYSTEM FOR DATA CARTRIDGE TAPE DRIVES

BACKGROUND OF THE INVENTION

1. Field of the Invention

The present invention relates generally to servo control systems for data cartridge tape drives. In particular, the present invention is a method for operating the servo system in closed-loop mode to compensate for servo track pitch errors.

2. Description of the Related Art

High capacity data cartridges and tape drives for writing data to and/or reading data from the magnetic tape in the cartridges are generally known and disclosed, for example, in the von Behren U.S. Pat. No. 3,692,225 and Moeller et al. U.S. Pat. No. 4,422,111. Cartridges of this type are configured to be removably positioned within the tape drive and are commonly used to back-up computer systems. The cartridges include a length of magnetic tape wound on a pair of hubs rotatably mounted within an enclosure. When the cartridge is operatively loaded within the drive, the tape is positioned adjacent to a magnetic read/write head assembly. The read/write head assembly includes multiple channels of read and write gaps. An endless flexible belt in frictional contact with the outer layer of the tape on both hubs drives the tape in forward and reverse directions along a transport path over the head assembly. Data is thereby written to and read from the tape.

The tape cartridges can include multitrack tape such as that disclosed in QIC Development Standard QIC-139. Multitrack tape of this type includes prerecorded servo track bands extending along the length of the tape. The servo track bands divide the tape into data zones. The servo track bands are formed by transversely spaced rows of erased blocks from the servo track band which is otherwise continuously recorded with a servo carrier signal.

The multitrack tape is driven at relatively high speeds (e.g. 120 inches per second in one embodiment) during the data reading and writing operations. The position of the tape along a tracking axis perpendicular to the servo tracks varies somewhat. To accurately read and write data on the tape, however, the read/write head assembly must be capable of accurately following the servo tracks as the tape is being driven.

Two-stage head positioning assemblies and servo control systems such as those disclosed in the Anderson et al. U.S. Pat. No. 5,280,402 can be incorporated into the tape drive to drive and position the read/write head assembly on the servo tracks as the tape is driven. The system shown in the Anderson et al. patent includes a stepper motor and a voice coil actuator for moving and positioning the head assembly. The stepper motor functions as a coarse positioner, and is capable of moving the voice coil actuator and head assembly across the full width of the magnetic tape and positioning the head assembly at a reference position. The voice coil actuator functions as a fine positioner and includes a spring or other biasing mechanism for supporting the head assembly at the reference position. The voice coil actuator is capable of quickly and accurately driving a head assembly over a range of two or more servo tracks from the reference position.

The servo system is operated in both an open-loop or track seek mode, and a closed-loop or track follow mode, to drive and position the head assembly on the tracking axis. During operation in the open-loop mode, the drive control system causes the stepper motor to step the voice coil actuator and head assembly and position selected read gaps at reference positions adjacent to desired servo tracks. When operated in the closed-loop mode, the servo system actuates the voice coil actuator in such a manner that the selected read gap follows or tracks (i.e., is "locked to") the desired servo track adjacent to which the read gap was positioned during the track seek operation.

Specifications for the tape call for the width of the erased gaps forming the servo tracks to be equal to the spacing between these gaps on the tracking axis. Ideally, the spacing between the centerlines of adjacent servo tracks, also known as track "pitch", is therefore equal for all servo tracks (e.g., 34 µm in one embodiment). In practice, however, the width of the erased blocks created during tape manufacturing procedures are often wider or narrower than the nominal specification. These variations in the detected width of the erased blocks can be caused by misalignment of the servo writer used to create erased blocks, by "blooming" of the servo writer magnetic field due to variations in the amount of current applied to the servo writer, or incompletely erased blocks. These variations in the width of the erased blocks result in undesirable track pitch or pairing errors (i.e., different spacings between adjacent servo tracks).

Apparent track pitch errors can also be caused by unsymmetrical response characteristics (i.e., sensitivity) of the read gaps. When tracking the true centerline of a servo track, one half of the servo read gap will be physically located over the erased block while the other half will be located over the recorded portion of the tape between the erased blocks. If the response characteristics of both halves of the servo read gap are identical, the output of the read gap will be a signal equal to 50% of the signal output if both halves were over the recorded portion of the tape. However, if the response characteristics of the read gap are not symmetrical, the output signal will be a value different from the expected value of 50% when the read gap is tracking the true centerline of the servo track. Since the servo control system is configured to operate on the basis that a 50% signal value indicates the true servo track centerline, signal variations caused by the unsymmetrical response characteristics of the servo read gap cause apparent track pitch errors.

Whether they result from inaccuracies in the width of the erased blocks or from unsymmetrical read gap sensitivities (i.e., whether caused by the tape drive components or the magnetic tape itself), track pitch errors must be compensated for by the tape drive servo system. One compensation method includes determining a worst-case track pitch error, and configuring the servo system to accommodate this degree of error. This approach is inefficient, however, since it results in reduced track densities and/or narrower read track widths. Reduced track densities are undesirable since they reduce the amount of information that can be recorded on the tape. Narrower read track widths result in decreased signal-to-noise ratios that detrimentally affect the performance of the tape drive.

It is evident that there is a continuing need for improved track pitch error compensation systems. The compensation system should enable the use of relatively high track densities without significantly affecting the read gap signal-to-noise ratio. The compensation system should also be capable of being efficiently implemented by the tape drive.

SUMMARY OF THE INVENTION

The present invention is a track pitch error compensation system for a tape drive of the type configured for reading data from and/or writing data to magnetic tape. The tape has adjacent servo tracks spaced about a tracking axis by a track pitch. Because of manufacturing and other variations, the track spacing can vary from its normal valve. These track spacing errors are known as track pitch errors. Manufacturing variations in components of the tape drive can also result in apparent track pitch errors. The tape drive includes a multichannel head assembly having a plurality of channels of read gaps which produce position error signals (PES) representative of positions of the read gaps on the tracking axis with respect to the servo tracks on the tape, a positioner and a servo control system. The positioner is responsive to positioner drive signals and drives the head assembly from a reference position and positions the head assembly on the tracking axis with respect to servo tracks on the tape. The servo control system is connected between the head assembly and the positioner, and generates positioner drive signals causing a servoing read gap to be servo locked to a desired servo track as a function of the PES when operated in a closed-loop servo mode. The method compensates for both actual and apparent track pitch errors, and is characterized by summing PES correction offsets with the PES while operating the servo control system in closed-loop servo mode. The added PES correction offsets are representative of the magnitudes of the positioner drive signals causing the positioner to drive the head assembly distances sufficient to correct the track pitch errors.

In one embodiment the PES correction offsets are determined for each magnetic tape and stored in memory. The PES correction offsets can be computed as a function of the track pitch errors and the DC gain of the servo system. The track pitch errors and the DC gain of the servo system can be measured by the servo system.

DETAILED DESCRIPTION OF THE PREFERRED EMBODIMENTS

Figure 1:
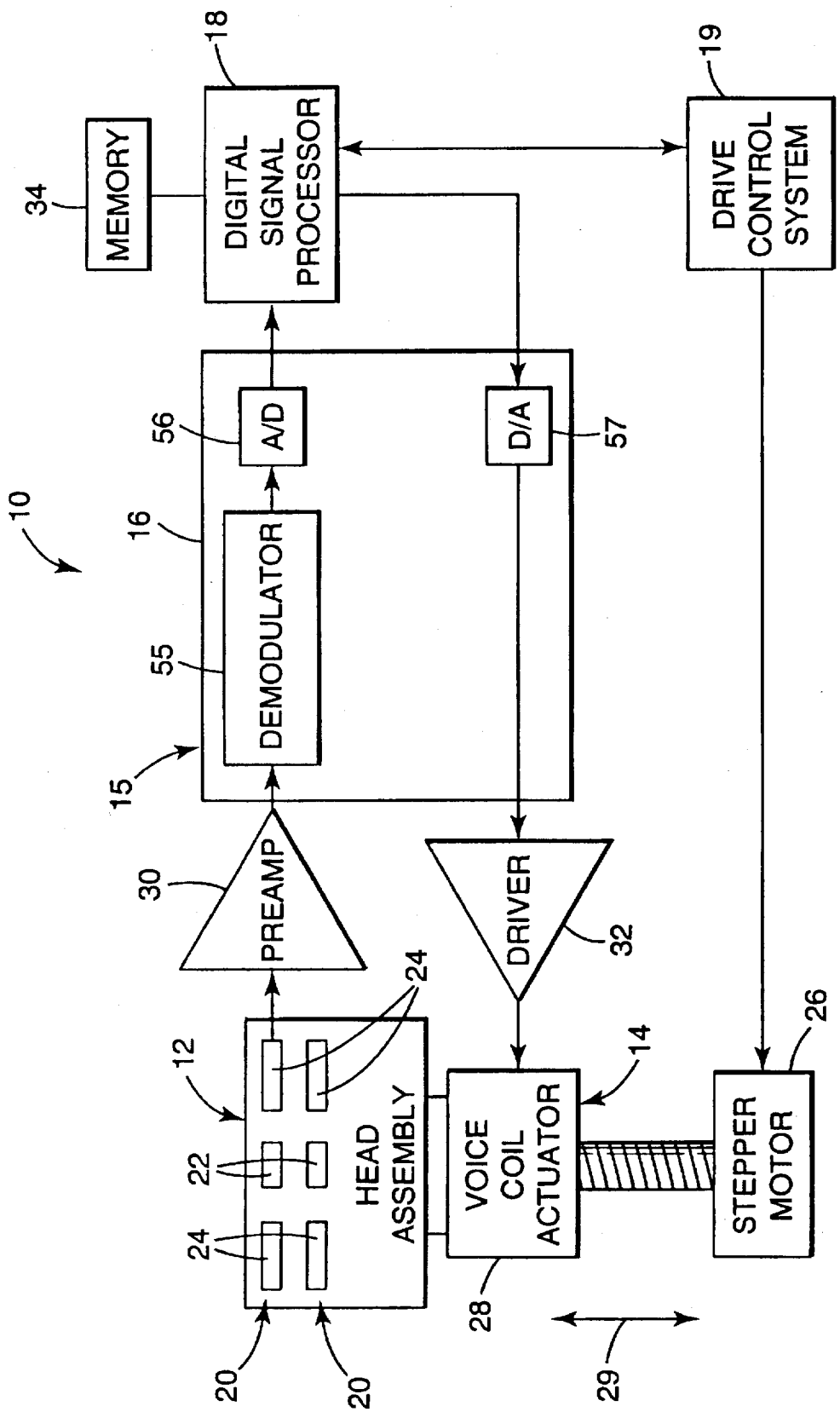
FIG. 1 is a block diagram of a tape drive including a servo system in which the track pitch error compensation system of the present invention can be implemented.

The present invention is a method for operating the servo system of a tape drive during closed-loop mode, to correct or compensate for actual and apparent track pitch or pairing errors (i.e., track pitch errors caused by the tape itself or by components of the tape drive). FIG. 1 is a block diagram of a tape drive 10 in which the track pitch error compensation method of the present invention can be implemented. Tape drive 10 includes a multichannel read/write head assembly 12 mounted to a head positioning assembly 14, servo system 15 and drive control system 19. Drive control system 19 controls the overall operation of tape drive 10 as data is written to and/or read from magnetic tape (not shown in FIG. 1) being driven past head assembly 12. Servo system 15 controls the position of head assembly 12 with respect to the tape during the data reading and writing operations, and includes SAFE (servo analog front end) IC (integrated circuit) 16, DSP (digital signal processor) 18 and associated memory 34, preamplifier (preamp) 30 and driver 32. Head assembly 12 includes a plurality (two are shown) of parallel channels 20, each having a write gap 22 positioned between a pair of read gaps 24. Although each read gap 24 of head assembly 12 is coupled to SAFE IC 16 by a preamplifier 30, the signal from only one read gap of each channel 20 is used to perform the track pitch error compensation procedure of the present invention. Only one preamplifier 30 is therefore shown in FIG. 1 for purposes of this description.

Figure 2:
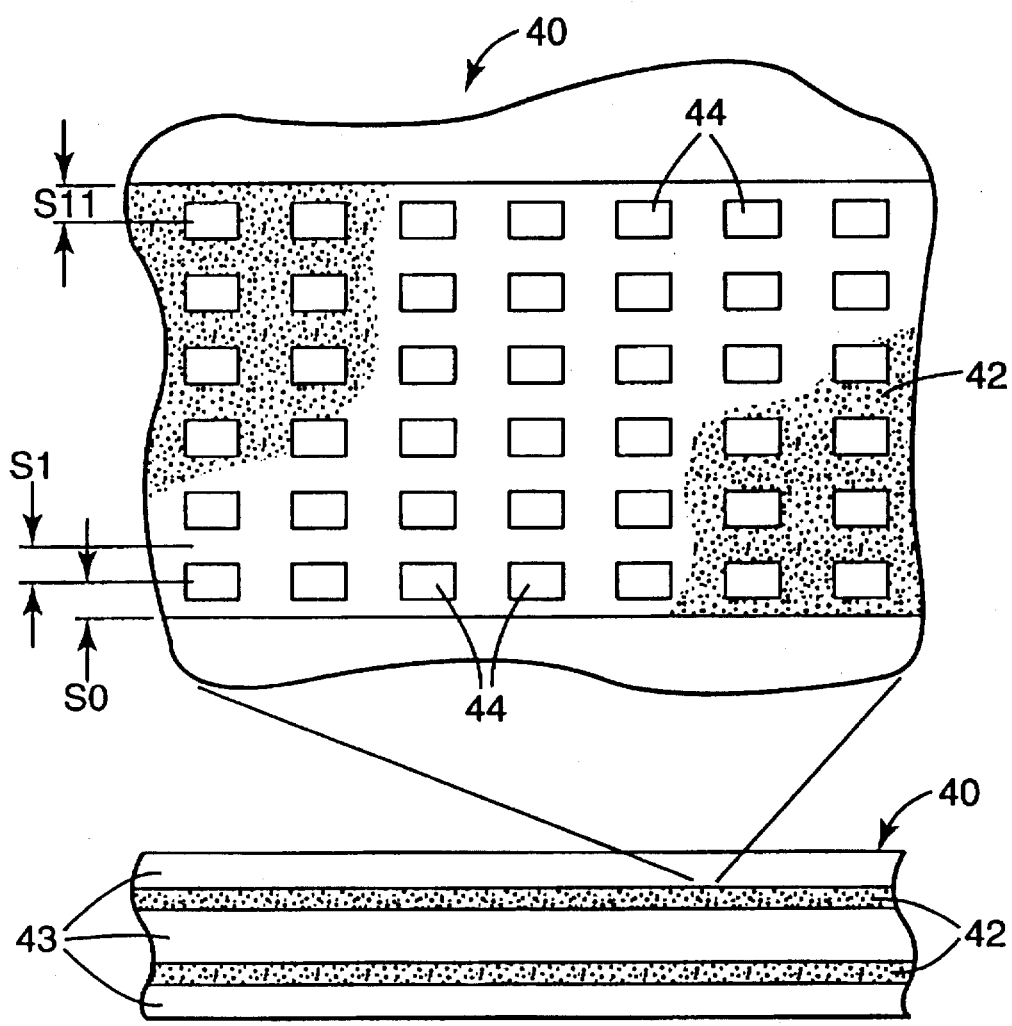
FIG. 2 is an illustration of the servo tracks of the magnetic tape used in conjunction with the tape drive shown in FIG. 1.

Tape drive 10 is configured for data reading and writing operations on a multitrack tape 40 such as that shown in FIG. 2. Tape 40 includes a plurality of transversely spaced, prerecorded servo track bands 42 which extend along the length of the tape and divide the tape into data zones 43. In the embodiment shown in FIG. 2, servo track bands 42 include twelve servo tracks S0–S11. Servo tracks S0–S11 are formed by transversely spaced rows of erased blocks 44 from the servo track band 42, which is otherwise continuously recorded with a servo carrier signal. The recorded servo carrier signal is represented by the speckling in FIG. 2. In one embodiment, the servo carrier is recorded at 6.773 Kftpi (kilo flux transitions per inch), or a frequency of 406.4 KHz when the tape is driven at a speed of 120 inches (304.8 cm) per second. In the embodiment described herein, the erased blocks 44 have a period of 0.0118 inches (0.30 mm), or a frequency of 10.16 KHz at the established 120 inch per second tape speed. The upper and lower edges of the erased blocks 44 define the centerlines of servo tracks S0–S11. In the convention used throughout the remainder of this description, "odd" servo tracks are those centered on the upper edges of erased blocks 44 (e.g., servo tracks S1 and S11), while "even" servo tracks are those centered on the lower edges of erased blocks 44 (e.g., servo tracks S0 and S2). In one embodiment, the width of erased blocks 44, and therefor the servo track pitch or spacing, is about 34 µm.

As shown in FIG. 1, head positioning assembly 14 includes a stepper motor 26 and a spring suspended voice coil actuator 28 for driving and positioning head assembly 12 on a tracking axis 29 which is generally perpendicular to the elongated axes of channels 20. Stepper motor 26 is responsive to coarse position control signals from drive control system 19, and functions as a coarse positioner. Stepper motor 26 is capable of moving head assembly 12 across the full width of the magnetic tape and positioning a selected channel 20 at a reference position adjacent to a desired servo track S0–S11 within a distance of less than about one track pitch.

Voice coil actuator 28 is a fine positioner responsive to voice coil drive signals from servo system 15, and is capable of quickly and accurately driving head assembly 12 from the reference position over a range of about two or even more servo tracks S0–S11. In one embodiment using a spring suspended voice coil actuator 28, the stroke (range of motion) of voice coil actuator 28 is about 100 µm (i.e., a range of almost three servo tracks S0–S11 that have the 34 μm track pitch described above). Voice coil actuator 28 is characterized by a proportionality constant K that relates the distance the voice coil will move from its neutral position in response to the application of voice coil drive signal of a given magnitude (e.g., μm/mA). The proportionality constant K can be determined by conventional measurement techniques, and is often specified by the manufacturer of the voice coil actuator 28. The proportionality constant K is also relatively linear (i.e., constant) over the stroke of the voice coil actuator 28. In one embodiment of tape drive 10, the linearity of voice coil actuator 28 is within about 1% over a 100 μm voice coil stroke. Although voice coil actuator 28 is used as a fine positioner in the embodiment described herein, other fine positioners having a linear response proportional to the drive signals can also be used.

Servo system 15 is operated in both an open-loop or track seek mode, and a closed-loop or track follow mode, to drive and position channels 20 of head assembly 12 with respect to servo tracks S0–S11 on tape 40. During operation in the open-loop mode, drive control system 19 generates coarse position control signals causing stepper motor 26 to move (i.e. "step") head assembly 12, and position selected channels 20 adjacent to desired servo tracks S0–S11.

When operated in closed-loop mode, servo system 15 generates voice coil drive signals causing voice coil actuator 28 to drive and position head assembly 12 in such a manner that the read gap 24 of a selected channel 20 follows or tracks (i.e., is "locked to") the servo track S0–S11 adjacent to which it was positioned during open-loop mode operation. Other channels 20 are then used for data reading and writing operations on data zones 43 of the tape 40. Throughout the remainder of this description, the selected read gap 24 being used for servoing during the operation of servo system 15 in closed-loop mode is referred to as the "servoing read gap 24". The selected servo track S0–S11 that the servoing read gap 24 is tracking or is locked to is referred to hereafter as the "desired servo track S". In effect, the servoing read gap 24 is positionally locked to the desired servo track S during the operation of servo system 15 in the closed-loop mode, to function as a guide for other channels 20 performing data reading and writing operations on the data zones 43.

Figure 3:
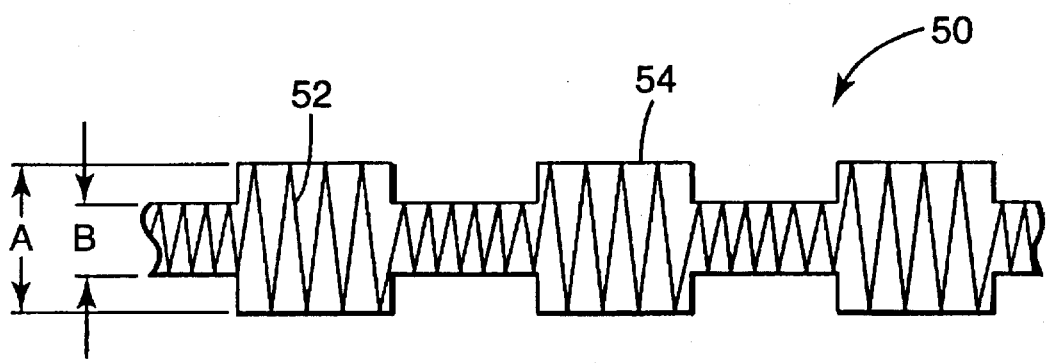
FIG. 3 is a graphic illustration of tracking control signals generated by the tape drive shown in FIG. 1 when used in conjunction with a magnetic tape of the type shown in FIG. 2.

During the operation of servo system 15 in closed-loop mode, servoing read gap 24 will generate tracking signals such as those illustrated generally at 50 in FIG. 3 when positioned over servo tracks S0–S11 as tape 40 is transported past head assembly 12. Tracking signals 50 includes a 406.4 KHz carrier signal 52 generated from the servo carrier signal on tape 40. The carrier signal 52 is modulated by the 10.16 KHz erased blocks 44 and has an envelope 54. Tracking signals 50 are representative of the direction (i.e., sign) and magnitude of the position of the center of the servoing read gap 24 with respect to the center of the desired servo track S. In particular, the position of the servoing read gap 24 can be determined by the ratio of the peak-to-peak amplitude A of the servo carrier signal 52 when the servoing read gap 24 is between the erased blocks 44, to the peak-to-peak amplitude B of the servo carrier signal when the servoing read gap is over the erased blocks. This relationship is described by Equation 1 below.

Servoing READ GAP POSITION=B/A     Eq. 1

Since the servo carrier signal is written across the full width of servo track bands 42, amplitude A will remain relatively constant and can function as a reference. However, amplitude B will vary between the values of zero and amplitude A as a function of the position of the servoing read gap 24 with respect to the center of the desired servo track S. For example, when servoing read gap 24 is centered on the desired servo track S (i.e., centered on the edge of erased blocks 44), amplitude B will be exactly one-half of the amplitude A. The servoing read gap position under this convention is 0.5 or 50%. When one-fourth of the servoing read gap 24 is located over the recorded portion of the desired servo track S, the servoing read gap position is 0.25 or 25%. Similarly, if three-fourths of the servoing read gap 24 is located over the recorded portion of the desired servo track S, the servoing read gap position is 0.75 or 75%.

The tracking signals 50 generated by servoing read gap 24 are amplified by preamplifier 30 and applied to SAFE IC 16. As shown in FIG. 1, SAFE IC 16 includes a demodulator 55, A/D (analog-to-digital) converter 56 and D/A (digital-to-analog) converter 57. Demodulator 55 is connected to receive the tracking signals 50 from preamplifier 30, and generates signals representative of amplitudes A and B by integrating positive and negative peaks of carrier signal 52. The signals representative of amplitudes A and B are applied to A/D converter 56. A/D converter 56 uses the amplitude A signal as a reference, and the amplitude B signal as an input. Digital position error signals (PES) in 2's complement format and representative of the ratio B/A are outputted by A/D converter 56. In one embodiment A/D converter 56 is an 8 bit device, and is configured to generate scaled PES having a value of zero when the ratio B/A equals one-half (i.e., at a 50% servoing read gap position). When the ratio B/A is equal to zero (i.e., at a 0% servoing read gap position), A/D converter 56 outputs its maximum negative digital value of minus one hundred and twenty-eight. When the servoing read gap position is 100%, the ratio B/A is equal to one and A/D converter 56 outputs its maximum positive digital value of one hundred and twenty-seven. The digital PES provided by A/D converter 56 are therefore representative of the direction and magnitude of the positional errors or offsets of the servoing read gap 24 with respect to the center of the desired servo track S.

The digital PES outputted by A/D converter 56 have the same form when the servoing read gap 24 is positioned over even and odd servo tracks S0–S11. However, when the servoing read gap 24 is locked to an even servo track S0–S10 and the head assembly 12 is moved upwardly with respect to the servo track, the value of the ratio B/A and therefore the value of the PES decrease. When read gap 24 is locked to an even servo track S0–S10 and the servoing read gap is moved downwardly with respect to the servo track, the value of the ratio B/A and therefore the value of the PES increase. The relationship between the polarity of PES changes in response to motion of the servoing read gap 24 with respect to even servo tracks S0–S10 is directly opposite that described above when the servoing read gap 24 is tracking an odd servo track S1–S11. The polarity of PES changes in response to motion of servoing read gap 24 in a given direction can therefore be used to determine whether the servoing read gap is tracking an even or an odd servo track S0–S11.

DSP 18 uses the PES and negative feedback to generate digital tracking control signals during the operation of servo system 15 in closed-loop mode. The digital tracking control signals are converted to analog form by D/A converter 57 and amplified by driver 32 before being applied to voice coil actuator 28 as analog voice coil drive signals. The digital tracking signals generated by DSP 18 are proportional to the analog voice coil drive signals outputted by driver 32. The analog voice coil drive signals actuate the voice coil actuator 28 and thereby drive head assembly 12 in a manner which locks the position of the servoing read gap 24 to the desired servo track S. DSP 18 can generate tracking control signals that lock the servoing read gap 24 to any desired offset position within the range of 0% to 100% with respect to the desired servo track S.

Figure 4:
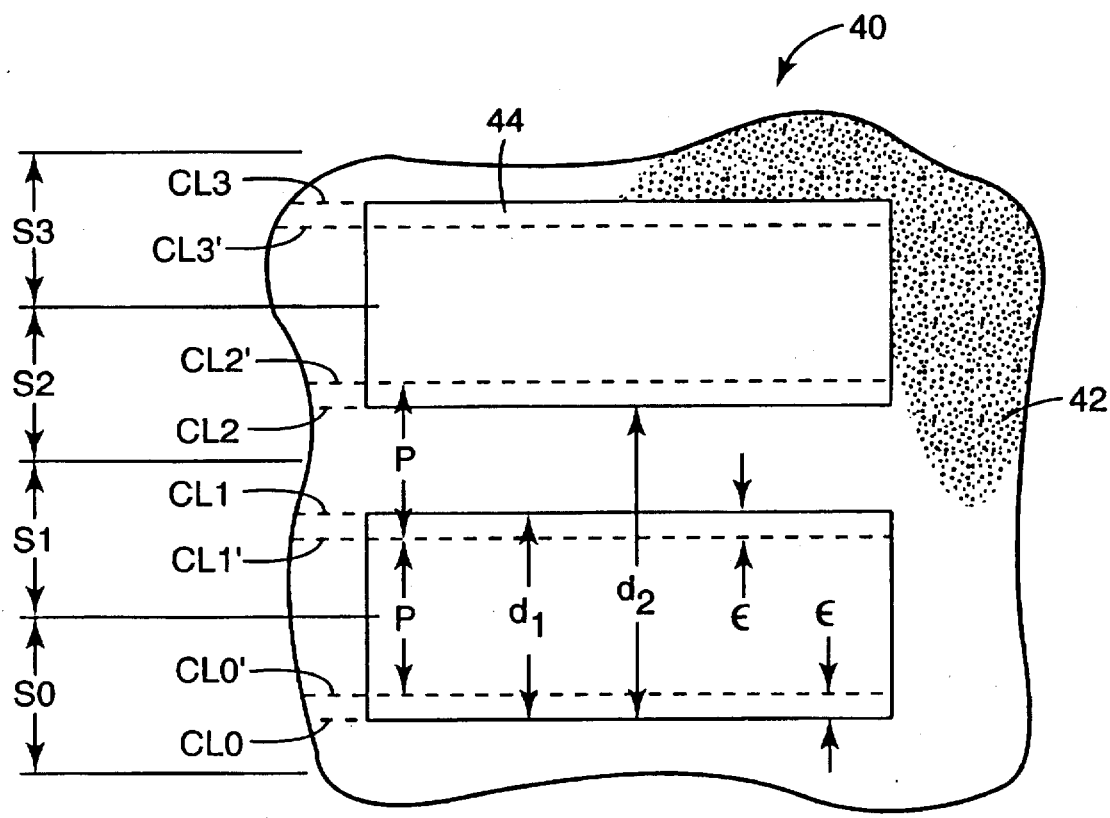
FIG. 4 is a detailed view of the servo tracks of the tape shown in FIG. 2, and illustrating the track pitch errors.

Track pitch errors on tape 40 can be described with reference to FIG. 4, where wider than optimum erased blocks 44 are shown for purposes of example. In this example, the erased windows 44 are wider than the desired track pitch P by a distance 2ε. The apparent or actual centerlines CL0–CL3 of servo tracks S0–S3 are therefore displaced from the ideal or desired centerlines CL0'–CL3', respectively, by pitch error distance ε. Tracking errors similar to those caused by the track pitch errors described above can also be caused by differing sensitivities of the upper and lower halves of the read gaps 24.

Figure 7:
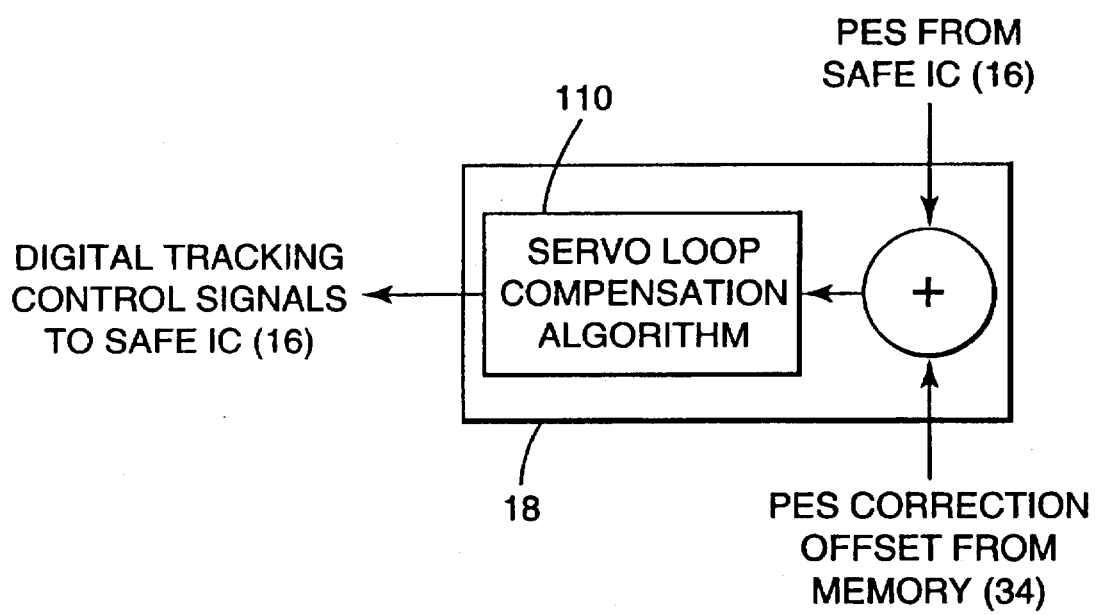
FIG. 7 is a block diagram of the track pitch error compensation system implemented by the tape drive shown in FIG. 1.

As shown in FIG. 7, the track pitch error compensation system of the present invention is performed by DSP 18 using a PES Correction Offset that is stored in memory 34. The PES Correction Offset is a value corresponding to the magnitude of the digital tracking control signals required to shift the position of voice coil actuator 28 and head assembly 12 by the pitch error distance ε. Before the PES from SAFE IC 16 is processed by conventional or otherwise known tracking compensation routines such as 110, the PES Correction Offset from memory 34 is summed with the PES. DSP 18 hereby generates tracking control signals causing the servoing read gap 24 to track ideal centerlines such as CL0'–CL3' during the operation of servo system 15 in closed-loop mode. The PES Correction Offset can be measured or calculated directly by DSP 18. In one embodiment, the PES Correction Offset is determined on the basis of a measurement of the pitch error distance ε. The PES Correction Offset need only be calculated to the degree of accuracy sufficient to compensate for the track pitch errors to the desired degree of accuracy.

Figure 5:
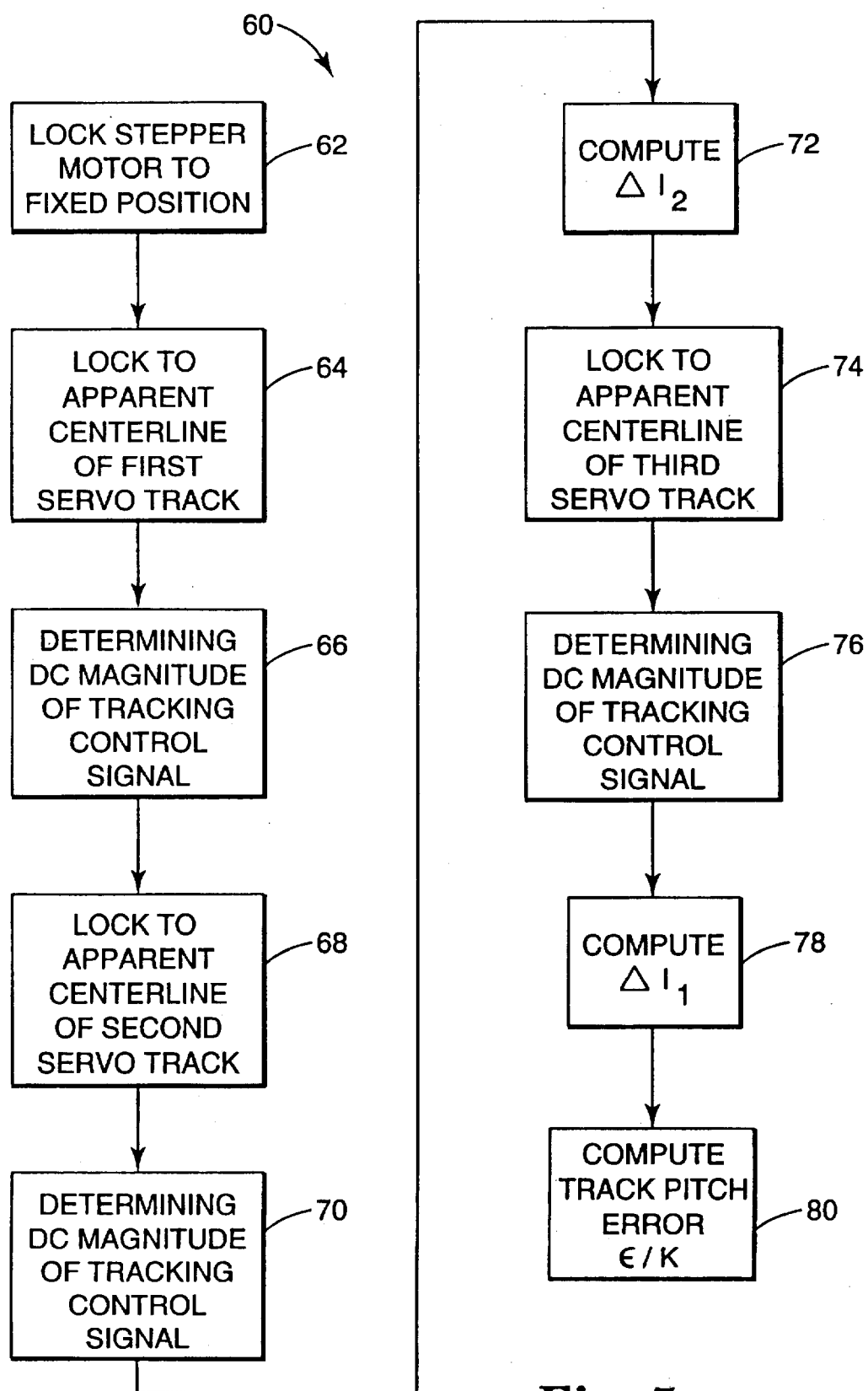
FIG. 5 is a flow diagram of a track pitch error measurement procedure which can be performed by the tape drive shown in FIG. 1 to determine the PES correction offset used by the compensation system.

FIG. 5 is a flow diagram of a pitch error measurement procedure 55 performed by servo system 15 to measure the pitch error distance ε. Procedure 60 is implemented by DSP 18 using a program stored in memory 34. As shown at step 62, DSP 18 first causes drive control system 19 to set or lock stepper motor 26 to a fixed position. DSP 18 then operates servo system 15 in closed-loop mode with the servoing read gap 24 locked to the apparent centerline of a first servo track (e.g., CL0 of servo track S0). This step is shown at 64 in FIG. 5. The magnitude of the digital tracking control signal generated by DSP 18 to lock the servoing read gap 24 to servo track S0 is then determined by the DSP as shown at step 66.

Following the steps described above, DSP 18 operates servo system 15 in closed-loop mode with the servoing read gap 24 locked to the apparent centerline of a second servo track two servo tracks from the servo track to which the servoing read gap 24 was locked at step 64 (e.g., CL2 of servo track 52). This step is shown at 68 in FIG. 5. The average or DC magnitude of the digital tracking control signal generated by DSP 18 to lock the servoing read gap 24 to servo track 52 is then determined by the DSP as shown at step 70. The difference between the digital tracking control signals measured at steps 66 and 70, $\Delta I_2$, is proportional to the distance between track centerlines CL0 and CL2 ($d_2$ in FIG. 4), and is computed by DSP 18 as shown at step 72. In effect, DSP 18 performs steps 62–72 to determine the absolute value of the average delta current required by voice coil actuator 28 to drive the servoing read gap 24 between adjacent odd or adjacent even servo tracks (i.e., a two track pitch delta drive signal).

Procedure 60 continues with DSP 18 operating servo system 15 in closed-loop mode with the servoing read gap 24 locked to the apparent centerline of a third servo track one track from the servo track to which the servoing read gap 24 was locked at step 66 (e.g., CL1 of servo track S1). This step is shown at 74 in FIG. 5. The magnitude of the digital tracking control signal generated by DSP 18 to lock the servoing read gap 24 to servo track S1 is then determined by the DSP as shown at step 76. The difference between the digital tracking control signals measured at steps 66 and 76, $\Delta I_1$, is proportional to the distance between track centerlines CL0 and CL1 ($d_1$ in FIG. 4), and is computed by DSP 18 as shown at step 78. Steps 62–66 and 74–78 are performed by DSP 18 to effectively determine the absolute value of the average delta current required by voice coil actuator 28 to drive the servoing read gap 24 between adjacent odd and even servo tracks (i.e., a one track pitch delta drive signal).

Using the measured values $\Delta I_1$ and $\Delta I_2$, DSP 18 computes the track pitch error value ε/K in terms of the magnitude of the digital tracking control signals required to drive the voice coil actuator 28 the error distance ε in accordance with Equation 2 below. This calculation is shown at step 80 in FIG. 5. K is the known voice coil actuator proportionality constant described above.

$$[(2\Delta I_1)-(\Delta I_2)]/4 = \epsilon/K \text{ (mA)} \qquad \text{Eq. 2}$$

The track pitch error value calculated using procedure 60 is representative of the error at the input of servo system 15 (i.e., corresponding to the PES outputted by preamplifier 30) in units of the digital tracking control signals corresponding to the output of the servo system (i.e., the voice coil drive signals). This track pitch error value is converted into a PES Correction Offset having units compatible with the input of servo system 15 in accordance with Equation 3 below.

$$\epsilon/K \times \kappa = \text{PES Offset Correction (PES counts)} \qquad \text{Eq. 3}$$

The constant κ is the plant-sensor DC gain constant of servo system 15 between the input to voice coil actuator 28 and the output of A/D converter 56. The PES is quantified in units arbitrarily referred to as "counts". Gain constant κ is therefore specified in units of "counts/mA".

Figure 6:
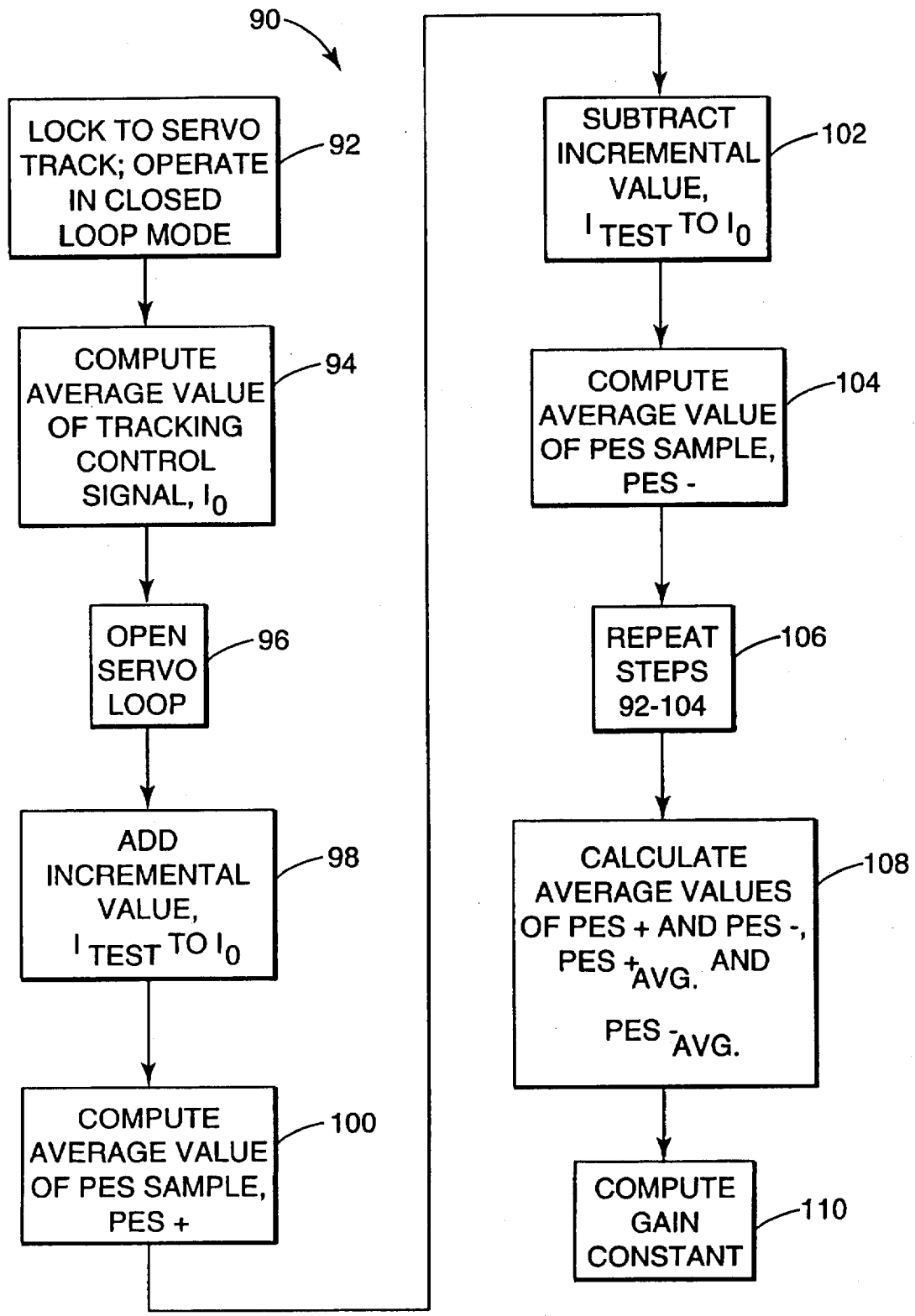
FIG. 6 is a flow diagram of a servo system DC gain constant measurement procedure which can be performed by the tape drive shown in FIG. 1 to determine the PES correction offset used by the compensation system.

FIG. 6 is a flow diagram of a gain constant measurement procedure 90 used to measure the gain constant κ. In one embodiment, characteristics of components of servo system 15 are sufficiently constant over time that gain constant κ is measured when tape drive 10 is manufactured, and stored in memory 34. In other embodiments, procedure 90 is implemented by DSP 18 using a program stored in memory 34 to compute the gain constant K each time a different cartridge is loaded into tape drive 10.

As shown at step 92 in FIG. 6, gain constant measurement procedure 90 begins with servo system 15 operating in closed-loop mode, and the servoing read gap 24 locked to any desired servo track S0–S11. The average DC value, $I_0$, of the digital tracking control signals is then computed as shown at step 94. $I_0$ is proportional to the average DC current value of the voice coil drive signals applied to voice coil actuator 28. Servo system 15 is then operated in open-loop mode (step 96), and an incremental test value $I_{test}$ added to the average DC value $I_0$ (step 98). $I_{test}$ is a value great enough to generate a significant (i.e., measurable) PES signal from the servoing read gap 24, but not so great as to result in PES clipping on tape tracking error peaks. The digital tracking control signal resulting from this summation is applied to voice coil actuator 28 through D/A converter 57 and driver 32. The average value, Pes⁺, of a relatively large number (e.g., one hundred) of PES samples is then computed as shown at step 100. The incremental test value $I_{test}$ is then subtracted from the average DC value $I_0$, and the digital tracking control signal resulting from this difference applied to voice coil actuator 28 through D/A converter 57 and driver 32 while the servo system 15 is operated in open-loop mode (step 102). The average value, Pes, of a relatively large number of PES samples is then computed as shown at step 104.

Steps 92–104 of procedure 90 are repeated a predetermined number of times (e.g., ten times in one embodiment) as shown at step 106. The average values determined at step 106 are then themselves averaged to obtain values $Pes^+_{avg}$ and $Pes^-_{avg}$ as shown at step 108. Tape tracking noise is effectively averaged away by performing steps 106 and 108. Gain constant κ is then calculated at step 110 in accordance with Equation 4 below.

$$(Pes^+_{avg} - Pes^-_{avg})/2I_{test} = \kappa \qquad \text{Eq. 4}$$

Procedure 90 measures the AC gain of components of servo system 15, with the frequency of the measurement being the rate at which the values Pes⁺ and Pes⁻ are computed at step 106. However, by using a relatively low frequency of measurement (e.g., less than 20 Hz) and making the measurement in a relatively low-noise portion of the cartridge spectrum, this measurement will accurately approximate the actual open-loop DC gain constant.

In alternative embodiments of the present invention, the PES Correction Offset is calculated from measured or otherwise known parameters of tape 40 and drive 10. Gain constant κ is comprised of two separate portions of servo system 15, the gain of the servo system from the servoing read gap 24 through SAFE IC 16, and the gain of voice coil actuator 28. This relationship is described by Equation 5 below.

$$\kappa = (\text{DC Actuator Gain } [\mu m/ma])/(\text{Read Gap to SAFE IC Gain } [\mu m/cnt]) \qquad \text{Eq. 5}$$

The gain of the PES is controlled to close specifications by the design of servo system 15, and includes the width of read gaps 24 and tolerances of demodulator 60. In one embodiment the PES gain is known to be about 2.92 microinches/PES count (0.074 μm/PES count). The electromechanical DC gain of voice coil actuator 28 (its displacement per unit of drive signal current) can be determined from the information measured during procedure 60. In particular, the distance between any two even or any two odd servo tracks S0–S11 is known (68 μm or 2677 μin in one embodiment). The magnitude of the delta digital tracking control signals required to drive the voice coil the distance between the two even or odd servo tracks S0–S11 ($\Delta I_2$) was measured during procedure 60. On the basis of this understanding, the PES Correction Offset can be calculated to a reasonable degree of accuracy directly from the measurements made during procedure 60 in the manner set forth below. Substituting these values into Equation 5 yields the relationship given in Equation 6 below.

$$\kappa = (1 \text{ PES cnt}/0.074 \ \mu m) \times (68 \ \mu m/\Delta I_2) = 917/\Delta I_2 \qquad \text{Eq. 6}$$

Substituting the relationships of Equation 6 and Equation 2 into Equation 3 yields the relationship of Equation 7. DSP 18 can calculate the PES Correction Offset using Equation 7.

$$\text{PES Correction Offset} = 229 \ [(2\Delta I_1/\Delta I_2) - 1] \qquad \text{Eq. 7}$$

The track pitch error compensation system of the present invention offers considerable advantages. Since the compensation system enables the servo system to lock to the ideal servo track centerlines even if the erased blocks are wider or narrower than desired, the track pitch of the tape system format does not have to be increased to accommodate servo formatting errors. In addition, the width of the read tracks need not be reduced to accommodate these servo format errors. Track pitch density, and as a result the data capacity of the cartridge, can therefore be maximized. The compensation method can also be easily and efficiently implemented in the tape drive.

Although the present invention has been described with reference to preferred embodiments, those skilled in the art will recognize that changes may be made in form and detail without departing from the spirit and scope of the invention.

What is claimed is:

1. In a tape drive of the type configured for reading data from and/or writing data to any of a plurality of magnetic tapes, each tape having adjacent servo tracks spaced about a tracking axis by a track pitch, and including a multichannel head assembly having a plurality of channels of read gaps which produce position error signals (PES) representative of positions of the read gaps on the tracking axis with respect to the servo tracks on the tape, a positioner responsive to positioner drive signals for driving and positioning the head assembly on the tracking axis with respect to servo tracks on the tape, and a servo control system connected between the head assembly and positioner for generating positioner drive signals causing a servoing read gap to be servo locked to a desired servo track as a function of the position error signals when operated in a closed-loop servo mode, a method for operating the servo control system to compensate for track pitch errors in the tape drive and/or magnetic tape; characterized by:

(a) determining PES correction offsets for each magnetic tape and head assembly combination by determining the track pitch errors, wherein determining the track pitch errors comprises the steps of:
determining one track pitch delta drive signal values representative of the magnitudes of positioner drive signals causing the positioner to drive the head assembly between two adjacent servo tracks;
determining two track pitch delta drive signal values representative of the magnitudes of positioner drive signals causing the positioner to drive the head assembly between two servo tracks spaced apart by a servo track; and
calculating the track pitch errors as a function of the one track pitch delta drive signal values and the two track pitch delta drive signal values;

(b) storing the PES correction offsets in memory; and (c) summing the PES correction offsets with the PES while operating the servo control system in closed-loop servo mode, the PES correction offsets representative of the magnitudes of the positioner drive signals causing the positioner to drive The head assembly distances sufficient to correct the track pitch errors.

2. The method of claim 1 wherein:
determining the one track pitch delta drive signal values includes:
servo locking a servoing read gap to a first servo track;
determining the DC magnitude of a first tracking control value representative of the magnitude of the positioner drive signals while the servoing read gap is servo locked to the first servo track;
servo locking the servoing read gap to a second servo track adjacent to the first servo track;

determining the DC magnitude of a second tracking control value representative of the magnitude of the positioner drive signals while the servoing read gap is servo locked to the second servo track; and calculating the one track pitch delta drive signal value as a function of a difference between the first tracking control value and the second tracking control value; and determining the two track pitch delta drive signal values includes:

servo locking the servoing read gap to a third servo track spaced apart from the first servo track by one servo track;

determining the magnitude of a third tracking control value representative of the magnitude of the positioner drive signals while the servoing read gap is servo locked to the third servo track; and calculating the two track pitch delta drive signal value as a function of a difference between the first tracking control value and the third tracking control value.

3. The method of claim 1 wherein determining the PES correction offsets is further characterized by:

determining a gain constant of the servo system; and calculating the PES correction offsets as a function of a product of the servo system gain constant and the track pitch error.

4. The method of claim 3 wherein determining the servo system gain constant includes measuring the servo system gain constant.

5. In a tape drive of the type configured for reading data from and/or writing data to any of a plurality of magnetic tapes, each tape having adjacent servo tracks with apparent centerlines spaced about a tracking axis, and including a multichannel head assembly having a plurality of channels of read gaps which produce position error signals (PES) representative of positions of the read gaps on the tracking axis with respect to the apparent centerlines of servo tracks on the tape, a positioner responsive to positioner drive signals for driving and positioning the head assembly on the tracking axis with respect to servo tracks on the tape, and a servo control system connected between the head assembly and positioner for generating positioner drive signals causing a servoing read gap to be servo locked to a desired servo track as a function of the PES when operated in a closed-loop servo mode, a method for operating the servo control system to compensate for the track pitch errors in the tape drive and/or magnetic tape and causing the servoing reed gap to be servo locked to desired centerlines of the servo tracks, the method characterized by:

determining and storing one or more track pitch error values for each magnetic tape, wherein determining the track pitch errors comprises the steps of:

determining one track pitch delta drive signal values representative of the magnitudes of positioner drive signals causing the positioner to drive the head assembly between two adjacent servo tracks;

determining two track pitch delta drive signal values representative of the magnitudes of positioner drive signals causing the positioner to drive the head assembly between two servo tracks spaced apart by a servo track; and calculating the track pitch errors as a function of the one track pitch delta drive signal values and the two track pitch delta drive signal values;

determining a gain constant of the servo system;

calculating as a function of the track pitch error values and the gain constant, and storing, PES correction offsets representative of the magnitudes of positioner drive signals causing the positioner to drive the head assembly distances sufficient to compensate for the track pitch errors; and summing the PES correction offsets with the PES while operating the servo system in closed-loop mode to cause the servoing read gap to be servo locked to the desired centerlines of the servo tracks.

6. The method of claim 5 wherein:

determining the one track pitch delta drive signal values includes:

servo locking a servoing read gap to the apparent centerline of a first servo track;

determining the DC magnitude of a first tracking control value representative of the magnitude of the positioner drive signals while the servoing read gap is servo locked to the apparent centerline of the first servo track;

servo locking the servoing read gap to the apparent centerline of a second servo track adjacent to the first servo track;

determining the DC magnitude of a second tracking control value representative of the magnitude of the positioner drive signals while the servoing read gap is servo locked to the apparent centerline of the second servo track; and calculating the one track pitch delta drive signal value as a function of a difference between the first tracking control value and the second tracking control value; and determining the two track pitch delta drive signal values includes:

servo locking the servoing read gap to the apparent centerline of a third servo track spaced part from the first servo track by one servo track;

determining the DC magnitude of a third tracking control value representative of the magnitude of the positioner drive signals while the servoing read gap is servo locked to the apparent centerline of the third servo track; and calculating the two track pitch delta drive signal value as a function of a difference between the first tracking control value and the third tracking control value.

7. The method of claim 6 wherein determining the servo system gain constant includes measuring the servo system gain constant.

* * * * *